United States Patent [19]

Kazaoka et al.

[11] Patent Number: 4,636,006
[45] Date of Patent: Jan. 13, 1987

[54] SEAT CUSHION STRUCTURE

[75] Inventors: Kenichi Kazaoka, Nagoya; Hiroshi Okazaki, Toyota; Yasuhisa Inaba, Handa, all of Japan

[73] Assignee: Aisin Seiki Kabushiki Kaisha, Kariya, Japan

[21] Appl. No.: 713,755

[22] Filed: Mar. 19, 1985

[30] Foreign Application Priority Data

Mar. 23, 1984 [JP] Japan ................... 59-56992
Mar. 23, 1984 [JP] Japan ................... 59-56991

[51] Int. Cl.⁴ .................................... A47C 7/35
[52] U.S. Cl. .................... 297/458; 267/142; 297/452
[58] Field of Search ........... 297/452, 455, 456, 458; 267/142, 144; 5/247, 255, 260

[56] References Cited

U.S. PATENT DOCUMENTS

| | | | |
|---|---|---|---|
| 2,568,829 | 9/1951 | Scott et al. ............... | 267/144 X |
| 2,620,861 | 12/1952 | Oothoudt .................. | 297/455 X |
| 2,817,390 | 12/1957 | Coites ...................... | 267/142 |
| 3,024,477 | 3/1962 | Reed ......................... | 297/455 |
| 3,071,413 | 1/1963 | Flint et al. ................ | 297/456 |
| 3,091,450 | 5/1963 | Reed ......................... | 297/456 |
| 3,669,498 | 6/1972 | Meyers et al. | |
| 4,065,182 | 12/1977 | Braniff et al. | |
| 4,147,336 | 4/1979 | Yamawaki et al. | |

FOREIGN PATENT DOCUMENTS 1288800 2/1962 France ........................... 297/456
662212 12/1951 United Kingdom .............. 297/455

Primary Examiner—Francis K. Zugel
Assistant Examiner—Peter R. Brown
Attorney, Agent, or Firm—Finnegan, Henderson, Farabow, Garrett & Dunner

[57] ABSTRACT

A seat cushion structure for use in a vehicle seat includes a seat cushion foam body having laterally spaced sides, a plurality of cushion springs disposed below and along the seat cushion foam body and resiliently supporting the seat cushion foam body, a cushion frame supporting the cushion springs, a border wire mounted on the cushion frame and supporting the sides of the seat cushion foam body, the border wire being connected to front ends of the cushion springs and including portions resiliently supported by the cushion frame, and a support spring disposed between the cushion frame and the cushion springs and resiliently supporting the cushion springs. The cushion frame is composed of elongate support members disposed in a front and rear position of the cushion frame and supporting the cushion springs and a frame-shaped holder disposed on the front and rear support members engaged with edges of a cover material covering the seat cushion foam body.

11 Claims, 3 Drawing Figures

SEAT CUSHION STRUCTURE

BACKGROUND OF THE INVENTION

1. Field of the Invention

The present invention relates to a seat cushion structure for use in a seat in a vehicle, particularly an automobile.

2. Description of the Prior Art

One known seat cushion structure for use a vehicle seat is illustrated in FIG. 1 of the accompanying drawings. The known seat cushion structure is composed of a plurality of cushion springs 22 extending below and along the lower surface of a cushion foam body 21 of a seat bottom unit 20 and resiliently supporting the cushion foam body 21, a seat cushion frame 23 supporting the cushion springs 22, and a border wire 24 mounted on the seat cushion frame 23 and supporting lateral side portions 21a (only one shown in FIG. 1) of the cushion foam body 21.

Fishmouth springs 25a, 25b are coupled between front and rear ends 22a, 22b of each of the cushion springs 22 and the seat cushion frame 23 to resiliently support the front and rear ends 22a, 22b of the cushion spring 22. The border wire 24 is resiliently supported by formed springy wires 26 (one shown) connected between the border wire 24 and the seat cushion frame 23.

The knees of the seat occupant can be supported by the fishmouth springs 25a coupled to the front ends 22a of the cushion springs 22, and the thighs of the seat occupant can be supported by the fishmouth springs 25b coupled to the rear ends 22b of the cushion springs 25b. The formed wires 26 connected to the border wires 24 are effective in supporting sides of the occupant's thighs.

With the above prior seat cushion structure, as described above, the fishmouth springs 25a, 25b are attached to the front and rear ends of the cushion springs 22 and the formed wires 26 are attached to the border wire 24 for supporting the knees, thighs, and thigh sides of the seat occupant. The fishmouth springs 25a, 25b and the formed wires 26 are complex in shape unlike so-called S-shaped springs such as the cushion springs 22, and hence are expensive. Therefore, the conventional seat cushion structure as a whole has been costly to manufacture.

Seat cushion frames support cushion springs disposed below a seat cushion foam body and resiliently supporting the cushion foam body. The cushion foam body is covered with a cover material having edges fastened to the seat cushion frame. As disclosed in Japanese Patent Publication No. 55-14646, the seat cushion frame comprises a rectangular frame body with the cushion springs extending beween and secured to front and rear edges of the frame body. The cover has its entire peripheral edge fastenable to the seat cushion frame. The seat cushion frame can support the seat cushion foam body as a whole.

The seat cushion frame is generally be formed by pressing a metal sheet. Since the front and rear edges of the seat cushion frame support the cushion springs, they are subjected to a high load imposed by the seat occupant through the cushion springs. To give the front and rear edges of the seat cushion frame a sufficient mechanical strength, the seat cushion frame has been formed by deep-drawing the metal sheet. The production of such seat cushion frames however results in a poor material efficiency. The deep-drawing process requires a number of pressing steps, with the result that the seat cushion frame is expensive to manufacture.

SUMMARY OF THE INVENTION

It is an object of the present invention to provide a seat cushion structure which can be manufactured inexpensively by enabling a border wire to resiliently support the sides of a cushion foam body.

Another object of the present invention is to provide a seat cushion frame composed of two members which can easily be fabricated, one member supporting cushion springs and the other member engaging a seat cover material.

According to the present invention, a border wire is mounted on a cushion frame and supports the sides of a seat cushion foam body, the border wire being connected to front ends of cushion springs and including portions resiliently supported by the cushion frame, and a support spring is disposed beween the cushion frame and the cushion springs to resiliently support the cushion springs. Since the portions of the border wire are resiliently supported by the cushion frame, the border wire can resiliently support the sides of the seat cushion foam body. The border wire connected to the front ends of the cushion springs resiliently supports the front ends of the cushion springs. The cushion springs are resiliently supported by the support springs disposed between the cushion frame and the cushion springs. Therefore, the sides of the thighs and the knees of the seat occupant are resiliently supported by the border wire, and the thighs of the seat occupant are resiliently supported by the support spring. Inasmuch as the border wire itself has a supporting capability, the seat cushion structure of the invention is less costly than conventional seat cushion structures. In addition, the front ends of the cushion springs are resiliently supported by the border wire which supports the sides of the seat cushion foam body. The front ends of the outer cushion springs are resiliently supported relatively firmly, while the front ends of the inner cushion springs are resiliently supported less firmly. The central front end of the seat is therefore resiliently yieldable to the extent required for the seat occupant to depress a brake pedal or the like.

According to another aspect of the present invention, the cushion frame supporting the cushion springs is composed of elongate support members disposed in a front and rear position of the cushion frame and a frame-shaped holder mounted on the front and rear suport members and engaged with edges of a seat cover material, the cushion springs being connected between the front and rear support members. The support member and the frame-shaped holder can be formed in a process other than a pressing process including a deep-drawing step. Since the elongate support member and the frame-shape holder are simple in shape, material efficiency is improved in forming the support member and the holder independently. The cushion frame can therefore be manufactured inexpensively without impairing its desired functions. The front support member is positioned slightly rearward of the front edge of the cushion frame. The support member is effective in reliably preventing the hip of the seat occupant from slipping in a forward direction. Since no other members than the holder are present at the front edge of the seat, the front seat edge is relatively soft to allow the knees of the seat occupant to move to depress the brake pedal or the like more freely than possible with the conventional cushion frames.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 3:
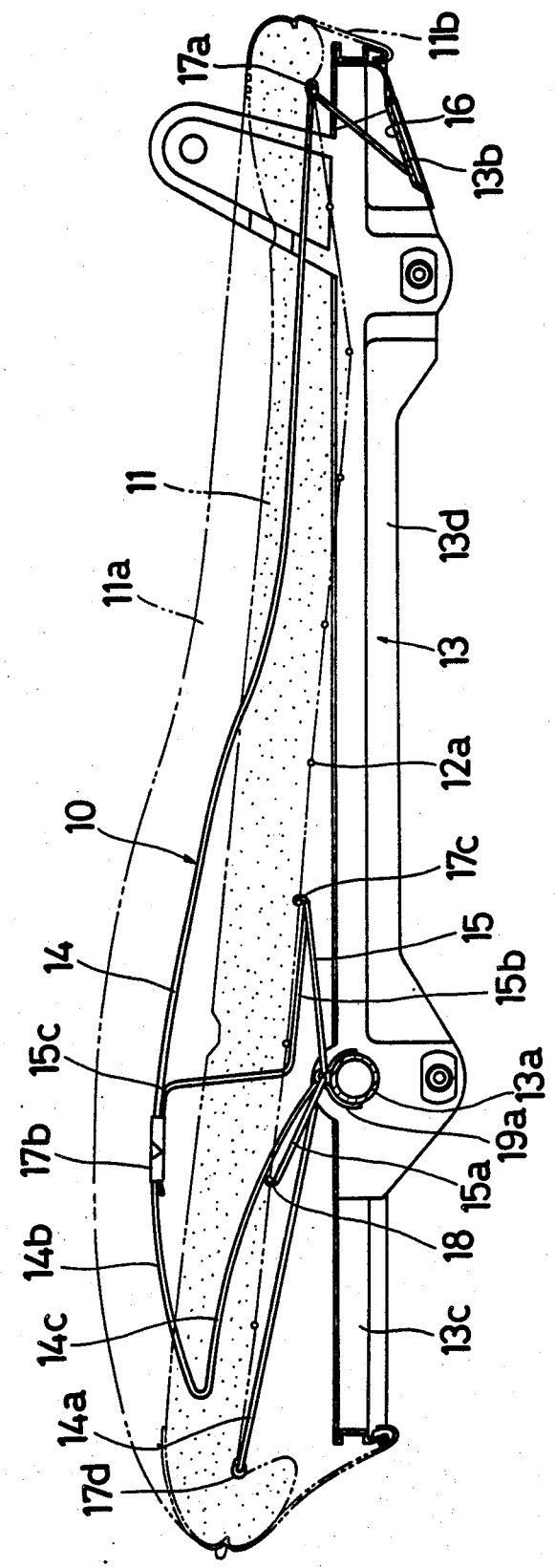
FIG. 3 is a cross-sectional view of the seat cushion structure illustrated in FIG. 2.

As shown in FIG. 3, a seat bottom unit for use in a vehicle such as an automobile is generally composed of a seat cushion foam body 11 and a seat cushion structure 10.

Figure 1:
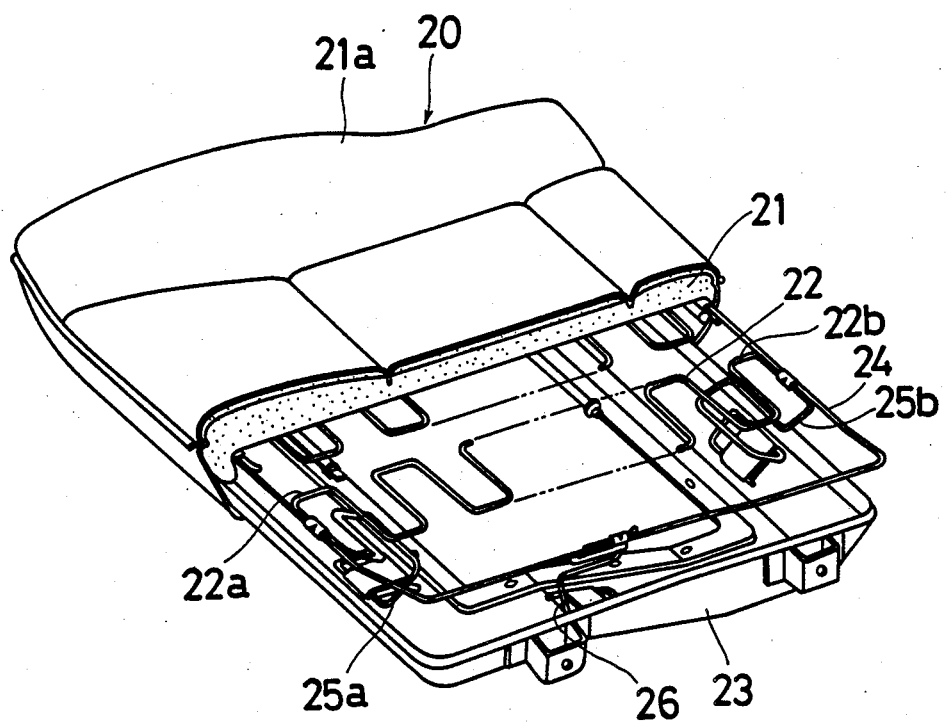
FIG. 1 is a perspective view, partly cut away, of a conventional seat cushion structure.
Figure 2:
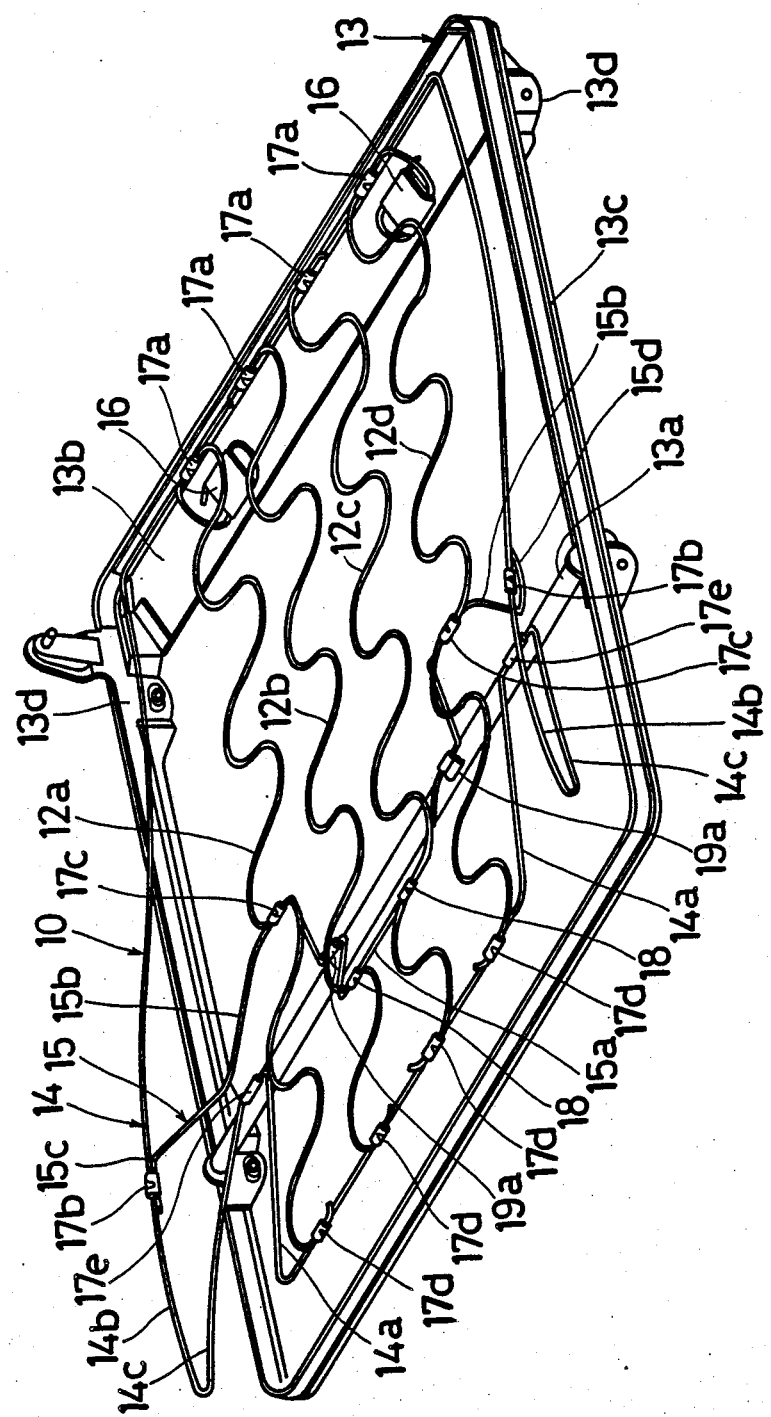
FIG. 2 is a perspective view of a seat cushion structure according to the present invention.

As illustrated in FIG. 2, the seat cushion structure comprises a rectangular seat cushion frame 13, a substantially rectangular border wire 14 mounted on the cushion frame 13 and extending substantially along outer edges of the seat cushion frame 13, four cushion springs 12a, 12b, 12c, 12d extending longitudinally across the seat cushion frame 13, and a support spring 15 disposed between the cushion springs 12a, 12b, 12c, 12d and the seat cushion frame 13.

The seat cushion frame 13 will first be described in detail. The seat cushion frame 13 is formed from a thin sheet of metal and has a certain cross section, the seat cushion frame 13 having a frame body or frame-shaped holder 13c of a rectangular shape formed preferably by rolling the thin metal sheet. As shown in FIG. 3, the frame body 13c is positioned below the seat cushion foam body 11 and has lower edges to which there are fastened edges of a cover material 11b covering the seat cushion foam body 11.

A plate 13b is welded to the rear edge of the frame body 13c. The plate 13b has opposite ends welded to rear ends of side brackets 13d, 13d, described later on. Although not shown, opposite ends of the frame body 13c are interconnected by the plate 13b. A metal pipe or elongate support member 13a extends between the side edges of the frame body 13c at a position spaced longitudinally from the front edge of the frame body 13c by about ⅓ through ¼ of the length of the frame body 13c. The metal pipe 13a has opposite ends welded to the side brackets 13d, 13d. Therefore, the seat cushion frame 13 has a sufficient mechanical strength imparted by the pipe 13a and the plate 13b.

The pipe 13a may be replaced with a plate, and the plate 13b may be replaced with a pipe. The frame body 13c may be partly dispensed with where the plate 13b lies. With this arrangement, the plate 13b is required to have means for engaging the cover 11b covering the seat cushion foam body 11.

The side brackets 13d, 13c are welded to inner surfaces of the side edges of the frame body 13c. Nuts are welded to front and rear ends of the side brackets 13d, 13d for attachment to seat slide guide rails or a vehicle body such as a vehicle floor, not shown. Therefore, the pipe 13a and the plate 13b which have a sufficient mechanical strength per se can be attached to the vehicle body through the side brackets 13d, 13d.

The border wire 14 is made of a springy material and has a substantially rectangular shape. The border wire 14 includes side portions 14b, 14b by which lateral sides 11a (FIG. 3) of the seat cushion foam body 11 are resiliently supported. The border wire 14 has a rear straight portion extending along the rear edge of the seat cushion frame 13. The rear straight portion of the border wire 14 has opposite ends from which the side portions 14b, 14b are bent right-angularly and extend along the side edges of the seat cushion frame 13 toward the front edge thereof. The side portions 14b, 14b are progressively raised away from the frame body 13c toward the front edge of the seat cushion frame 13.

The border wire 14 also has retaining portions 14c, 14c bent downwardly from front ends of the side portions 14b, 14b toward the rear edge of the seat cushion frame 13. From the retaining portions 14c, 14c, there extend supporting portions 14a, 14a, respectively, bent upwardly toward the front edge of the seat cushion frame 13. The supporting portions 14a, 14a are interconnected by a front straight portion. The border wire 14 also includes straight attachment portions between the retaining and supporting portions 14c, 14a in respective pairs. The pipe 13a extending between the side edges of the rectangular seat cushion frame 13 support attachment strips 17e by which the attachment portions of the border wire 14 are engaged to support the border wire 14 on the pipe 13a. Therefore, the side portions 14b, 14b of the border wire 14 are resiliently supported by the retaining portions 14c, 14c, respectively.

The four cushion springs 12a, 12b, 12c, 12d extending longitudinally over the seat cushion frame 13 comprise so-called S-shaped springs for resiliently supporting the lower surface of the seat cushion foam body 11. The cushion springs 12a, 12b, 12c, 12d have front ends secured to the front straight portion of the border wire 14 by clips 17d, 17d, 17d, 17d, respectively, and rear ends secured to the rear straight portion of the border wire 14 by clips 17a, 17a, 17a, 17a, respectively. Thus, the front ends of the cushion springs 12a, 12b, 12c, 12d are resiliently supported by the supporting portions 14a, 14a of the border wire 14. The rear ends of the two cushion springs 12a, 12d are also fastened to the plate 13b by clips 16, 16 which are formed by pressing. The cushion springs 12a, 12d thus resiliently support the rear straight portion of the border wire 14.

The support spring 15 is a spring known as a so-called formed wire disposed between the pipe 13a and the cushion springs 12a, 12b, 12c, 12d and extending substantially over and along the pipe 13a. The support spring 15 has a front support portion 15a positioned centrally and extending upwardly in a forward direction, and rear support portions 15b, 15b positioned one on each side of the front support portion 15a and extending upwardly in a rearward direction. As shown in FIG. 3, the support spring 15 is substantially of a V shape when viewed in side elevation. The front support portion 15a and the rear support portions 15b, 15b jointing constitute a torsion spring.

The cushion springs 12b, 12c are secured to the front support portion 15a by clips 18, 18, respectively, and the cushion springs 12a, 12c are secured to the rear support portions 15b, 15b by clips 17c, 17c, respectively. The support spring 15 also includes attachment portions positioned between the front support portion 15a and the rear support portions 15b, 15b, the attachment portions being fastened to the pipe 13a by attachment strips 19a, 19a fixed to the pipe 13a. Therefore, the support spring 15 resiliently support the cushion springs 12a, 12b, 12c, 12d thereover at a position spaced longitudinally from the front ends of the cushion springs 12a, 12b, 12c, 12d by ⅓ through ¼ of the length of these cushion springs. The support spring 15 has opposite ends 15c, 15d located outwardly of the rear support portions 15a, 15a and secured by respective clips 17b, 17b to the side portions 14b, 14b of the border wire 14. Accordingly, the side portions 14b, 14b of the border wire 14 are resiliently supported by the support spring 15.

Operation of the seat cushion structure thus constructed is as follows:

The spring members disposed over the seat cushion frame 13, that is, the border wire 14, the cushion springs 12a, 12b, 12c, 12d, and the support spring 15, are secured to the pipe 13a and the plate 13b on the cushion frame 13. Each of the pipe 13a and the plate 13b has a sufficient mechanical strength per se, and is securely anchored to the vehicle body. Therefore, the cushion frame 13 can sufficiently withstand the resilient forces of the springs and also the load imposed by the seat occupant through the seat cushion foam body 11 and the springs. Since the frame body 13c of the cushion frame 13 is subjected to no load but only holds the edges of the cover material 11b, the frame body 13c may be formed of a rolled sheet.

The side portions 14b of the border wire 14 are resiliently supported on the pipe 13a by the retaining portions 14c bent from the front ends of the side portions 14b. The side portions 14b are also resiliently supported on the pipe 13a by the opposite ends 15c, 15d of the support spring 15 which support the cushion springs 12a, 12b, 12c, 12d. No other spring means are required for the side portions 14b of the border wire 14, i.e., the sides 11a of the seat cushion foam body 11, to resiliently support the sides of the thighs of the seat occupant.

The front ends of the cushion springs 12a, 12b, 12c, 12d are resiliently supported on the pipe 13a by the supporting portions 14a of the border wire 14. The cushion springs 12a, 12b, 12c, 12d are resiliently supported by the support spring 15 at the position spaced longitudinally from the front ends of the cushion springs 12a, 12b, 12c, 12d by ⅓ through ¼ of the length of these cushion springs. As a consequence, the front end portions of the cushion springs 12a, 12b, 12c, 12d are supported at longitudinally displaced positions by the supporting portions 14a of the border wire 14 and the support spring 15, and hence the front end portions of the cushion springs 12a, 12b, 12c, 12d which extend from the front ends thereof to the position spaced therefrom by ⅓ through ¼ of the spring length, are resiliently supported upwardly relatively firmly. However, the front ends of the cushion springs 12a, 12b, 12c, 12d are resiliently supported upwardly only by the support portions 14a of the border wire 14, and therefore the front end of the seat cushion foam body 11 is resiliently supported upwardly relatively softly. Consequently, the knees of the seat occupant held by the front end of the seat cushion foam body 11 are normally supported securely, but can be moved to depress a brake pedal or the like since the front end of the seat cushion foam body 11 is easily yieldable.

The front ends of the outer cushion springs 12a, 12d are supported by the supporting portions 14a of the border wire 14. The front end of the seat cushion foam body 11 is therefore resiliently supported upwardly at its lateral sides relatively firmly and at its central portion relatively softly. This, together with the ease with which the front central end of the seat cushion foam body 11 is yieldable, allows the seat occupant to depress the brake pedal or the like with ease.

As described above, the cushion springs 12a, 12b, 12c, 12d are resiliently supported by the support spring 15 at the position spaced longitudinally from the front ends of the cushion springs 12a, 12b, 12c, 12d by ⅓ through ¼ of the length of these cushion springs. Therefore, the front end portions of the cushion springs 12a, 12b, 12c, 12d can reliably support the thighs of the seat occupant, and particularly prevent the hip of the seat occupant from slipping forward at the time of braking the vehicle abruptly.

Although a certain preferred embodiment has been shown and described, it should be understood that many changes and modifications may be made therein without departing from the scope of the appended claims.

What is claimed is:

1. A seat cushion structure comprising:
   a seat cushion foam body having laterally spaced sides;
   a cushion frame having longitudinally spaced front and rear edges and laterally spaced side edges, said cushion frame being positioned below said seat cushion foam body;
   a support member connecting said side edges intermediate said front and rear edges and spaced a predetermined distance from said front edge;
   a border wire having a rear portion extending along the rear edge of said frame and side portions extending along respective side edges of said frame to points above and substantially even with said frame front edge, said border wire having retaining portions extending downwardly and rearwardly from said points to said support member along respective side edges of said frame, said border wire having a support portion extending from said support member upwardly and forwardly toward said front edge of said frame inwardly of said retaining portions;
   first means connecting said border wire to said support member at a juncture of said support portion and said retaining portion of said border wire adjacent each of said side edges of said frame, and second means connecting said rear portion of the border wire to said rear edge of the frame;
   a plurality of cushion springs, each having front and rear ends, disposed below said foam seat cushion, said springs connected at each said front end to said support portion of said border wire and connected at each said rear end to said rear portion of said border wire, said cushion springs supporting said foam seat cushion; and
   a support spring connected at opposite ends to respective side portions of said border wire at a location on each said side portion rearwardly of said points of said border wire, said support spring being connected intermediate said opposite ends to said support member, and said suport spring being connected also to each of said cushion springs rearwardly of the respective front ends of each said cushion spring.

2. A seat cushion structure according to claim 1, wherein said support member is positioned from the front edge of said frame a distance corresponding to a range of from ¼ to ⅓ of the total distance between the front and rear edges of said frame.

3. A seat cushion structure according to claim 1, further comprising a cover material covering said seat cushion foam body, said cover material being engaged by said front, rear and side edges of said frame.

4. A seat cushion structure according to claim 1, wherein the side portions of said border wire progressively rise above said cushion frame side edges from a point adjacent said cushion frame rear edge.

5. The seat cushion structure according to claim 4, wherein the laterally spaced sides of said seat cushion foam body are supported by said raised border wire side portions.

6. A seat cushion structure according to claim 1, wherein said plurality of cushion springs each have a serpentine shape.

7. A seat cushion structure according to claim 6, wherein said support spring is connected to each of said cushion springs spaced rearwardly of the front ends of said cushion springs a distance corresponding to a range of from ¼ to ⅓ the total length of each respective spring.

8. A seat cushion structure according to claim 1, wherein said side portions and said retaining portions of said border wire are resilient.

9. A seat cushion structure according to claim 1, wherein said support spring comprises a torsion spring.

10. A seat cushion structure according to claim 1, wherein said frame comprises a rolled frame body.

11. A seat cushion structure according to claim 1, wherein said cushion frame is adapted to be fixed to a floor.

* * * * *